United States Patent
Lopez et al.

(10) Patent No.: US 11,676,316 B1
(45) Date of Patent: Jun. 13, 2023

(54) SHAREABLE SETTINGS FOR MODIFYING IMAGES

(71) Applicant: Instasize, Inc., Sandy, UT (US)

(72) Inventors: Hector Lopez, Salt Lake City, UT (US); Eddy Homez-Devroom, Salt Lake City, UT (US); Omar Arambula, Salt Lake City, UT (US)

(73) Assignee: Instasize, Inc., Sandy, UT (US)

( * ) Notice: Subject to any disclaimer, the term of this patent is extended or adjusted under 35 U.S.C. 154(b) by 0 days.

(21) Appl. No.: 16/917,608

(22) Filed: Jun. 30, 2020

Related U.S. Application Data

(60) Provisional application No. 62/869,056, filed on Jul. 1, 2019.

(51) Int. Cl.
  *G06T 11/60* (2006.01)
  *H04L 67/06* (2022.01)
  *G06F 16/176* (2019.01)
  *G06T 11/00* (2006.01)

(52) U.S. Cl.
  CPC .......... *G06T 11/60* (2013.01); *G06F 16/176* (2019.01); *G06T 11/001* (2013.01); *H04L 67/06* (2013.01)

(58) Field of Classification Search
  CPC .............................. G06F 3/048; G06F 3/1257
  See application file for complete search history.

(56) References Cited

U.S. PATENT DOCUMENTS

| | | | |
|---|---|---|---|
| 5,835,712 A | 11/1998 | Dufresne | |
| 6,229,541 B1 | 5/2001 | Kamen et al. | |
| 6,701,345 B1 | 3/2004 | Carley et al. | |
| 7,013,428 B1 | 3/2006 | Kamen et al. | |
| 7,403,901 B1 | 7/2008 | Carley et al. | |
| 7,477,800 B2 | 1/2009 | Avidan et al. | |
| 8,078,963 B1 | 12/2011 | Rosner et al. | |
| 8,990,672 B1 | 3/2015 | Grosz et al. | |
| 9,135,663 B1 | 9/2015 | Heiferman et al. | |
| 9,264,462 B2 | 2/2016 | Heiferman et al. | |

(Continued)

FOREIGN PATENT DOCUMENTS

WO  2019171128 A1  9/2019

OTHER PUBLICATIONS

FilterGrade Photoshop Actions & Lightroom Presets, retrieved Jun. 25, 2019 from https://filtergrade.com/ (4 pages).

(Continued)

*Primary Examiner* — Weiming He
(74) *Attorney, Agent, or Firm* — VLP Law Group LLP; Michel Bohn

(57) ABSTRACT

A system for sharing settings for modifying images is described. In an example embodiment, an image-modification application may display an image and editing elements in a user interface programed to edit image-adjustment settings that affect aspects of the image on the user interface. The image-modification application may receive user inputs modifying the editing elements and, in response, modify image-adjustment settings and apply the modified image-adjustment settings to the visual aspects of the image. In some embodiments, the image-modification application may receive a first user input requesting to export a settings file including the modified image-adjustment settings, generate the settings file based on the modified image-adjustment settings, and export the settings file.

20 Claims, 8 Drawing Sheets

(56) References Cited

U.S. PATENT DOCUMENTS

| | | |
|---|---|---|
| 10,033,767 B2 | 7/2018 | Pashman et al. |
| 10,140,392 B1 | 11/2018 | Bowen |
| 10,305,758 B1 | 5/2019 | Bhide et al. |
| 10,325,013 B2 | 6/2019 | Mondal |
| 10,594,774 B2* | 3/2020 | Thomas ............ H04L 67/06 |
| 10,742,433 B2 | 8/2020 | Whalin et al. |
| 10,867,081 B2 | 12/2020 | Bowen |
| 2002/0087352 A1 | 7/2002 | Armstrong et al. |
| 2002/0108034 A1* | 8/2002 | Hashem ............ H04L 63/0428 |
| | | 713/153 |
| 2004/0001106 A1 | 1/2004 | Deutscher et al. |
| 2004/0133598 A1 | 7/2004 | Dobrowski et al. |
| 2005/0084232 A1 | 4/2005 | Herberger et al. |
| 2006/0161850 A1 | 7/2006 | Seaberg |
| 2007/0005634 A1 | 1/2007 | Selca et al. |
| 2007/0038567 A1 | 2/2007 | Allaire et al. |
| 2007/0079236 A1 | 4/2007 | Schrier et al. |
| 2008/0052163 A1 | 2/2008 | Koh |
| 2008/0270358 A1 | 10/2008 | Chatow et al. |
| 2008/0276175 A1 | 11/2008 | Kim et al. |
| 2008/0295092 A1 | 11/2008 | Tan et al. |
| 2009/0150758 A1 | 6/2009 | Gejdos et al. |
| 2010/0017371 A1 | 1/2010 | Whalin et al. |
| 2011/0072035 A1 | 3/2011 | Gaucas et al. |
| 2011/0161130 A1 | 6/2011 | Whalin et al. |
| 2011/0187914 A1* | 8/2011 | Lee ................. H04N 5/222 |
| | | 348/E5.024 |
| 2011/0239158 A1 | 9/2011 | Barraclough et al. |
| 2011/0280497 A1 | 11/2011 | Berger et al. |
| 2011/0289142 A1 | 11/2011 | Whalin et al. |
| 2011/0289433 A1 | 11/2011 | Whalin et al. |
| 2011/0305433 A1 | 12/2011 | Singer |
| 2012/0173976 A1* | 7/2012 | Herz ................ G06F 3/04815 |
| | | 715/716 |
| 2012/0179980 A1 | 7/2012 | Whalin et al. |
| 2012/0179981 A1 | 7/2012 | Whalin et al. |
| 2012/0277914 A1 | 11/2012 | Crow et al. |
| 2012/0278704 A1 | 11/2012 | Ying et al. |
| 2012/0294514 A1 | 11/2012 | Saunders et al. |
| 2013/0211980 A1 | 8/2013 | Heiferman et al. |
| 2013/0212494 A1 | 8/2013 | Heiferman et al. |
| 2014/0013217 A1 | 1/2014 | Hashii et al. |
| 2014/0092424 A1 | 4/2014 | Grosz |
| 2014/0096017 A1 | 4/2014 | Grosz |
| 2014/0109046 A1 | 4/2014 | Hirsch et al. |
| 2014/0193047 A1 | 7/2014 | Grosz et al. |
| 2014/0195921 A1 | 7/2014 | Grosz et al. |
| 2014/0229462 A1 | 8/2014 | Lo |
| 2015/0007132 A1 | 1/2015 | Baldwin et al. |
| 2015/0019305 A1 | 1/2015 | Gorawala |
| 2015/0040031 A1 | 2/2015 | Lee et al. |
| 2015/0205950 A1* | 7/2015 | Vayvod ............ G06F 21/51 |
| | | 726/30 |
| 2015/0310520 A1 | 10/2015 | Donato et al. |
| 2016/0092935 A1 | 3/2016 | Bradley et al. |
| 2016/0224999 A1 | 8/2016 | Mukherjee et al. |
| 2016/0234267 A1 | 8/2016 | Hebbar |
| 2016/0275067 A1 | 9/2016 | Mei et al. |
| 2016/0294762 A1 | 10/2016 | Miller |
| 2017/0017371 A1 | 1/2017 | Hundemer et al. |
| 2017/0060509 A1 | 3/2017 | Tulasi |
| 2017/0116179 A1 | 4/2017 | Gagne-Langevin et al. |
| 2017/0139930 A1 | 5/2017 | Maloney |
| 2017/0160904 A1 | 6/2017 | Tene |
| 2017/0185254 A1 | 6/2017 | Zeng et al. |
| 2017/0185268 A1 | 6/2017 | Zeng et al. |
| 2017/0270078 A1 | 9/2017 | Rajwat et al. |
| 2017/0270079 A1 | 9/2017 | Rajwat et al. |
| 2017/0315683 A1 | 11/2017 | Boucher et al. |
| 2017/0364981 A1 | 12/2017 | Simpson et al. |
| 2018/0018078 A1 | 1/2018 | Hundemer et al. |
| 2018/0020034 A1 | 1/2018 | Hundemer et al. |
| 2018/0025371 A1 | 1/2018 | Perriman et al. |
| 2018/0025373 A1 | 1/2018 | Perriman et al. |
| 2018/0083894 A1 | 3/2018 | Fung et al. |
| 2018/0114238 A1 | 4/2018 | Treiser |
| 2019/0004688 A1 | 1/2019 | Bowen |
| 2020/0008652 A1* | 1/2020 | Makino ............ A61B 1/0051 |
| 2020/0104277 A1 | 4/2020 | Maloney |
| 2020/0159870 A1 | 5/2020 | Bowen |
| 2020/0159871 A1 | 5/2020 | Bowen |
| 2020/0160612 A1 | 5/2020 | Bowen |

OTHER PUBLICATIONS

Fonts, Graphics, Themes and More—Creative Market, retrieved Jun. 25, 2019 from https://creativemarket.com/ (2 pages).

Rubinstein M., et al., A Comparative Study of Image Retargeting, retrieved from https://people.csail.mit.edu/mrub/papers/retBenchmark.pdf, 2010, (9 pages).

Schiappa, M., DeepLabv3: Semantic Image Segmentation, Towards Data Science Blog Post, Sep. 23, 2019, retrieved from https://towardsdatascience.com/deeplabv3-c5c749322ffa on May 21, 2020 (7 pages).

Seam Carving, In Wikipedia, retrieved from https://en.wikipedia.org/wiki/Seam_carving May 21, 2020 (8 pages).

* cited by examiner

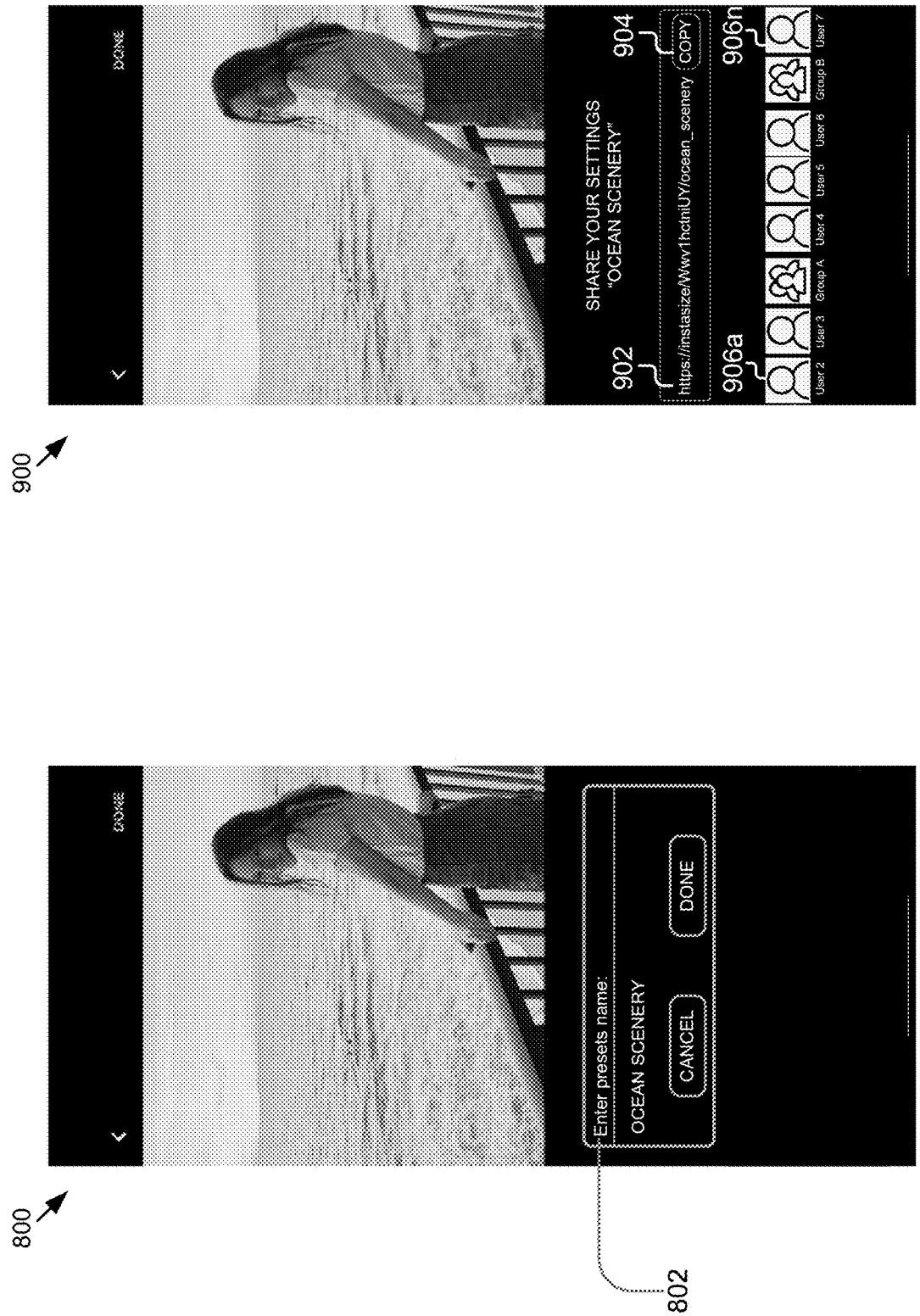

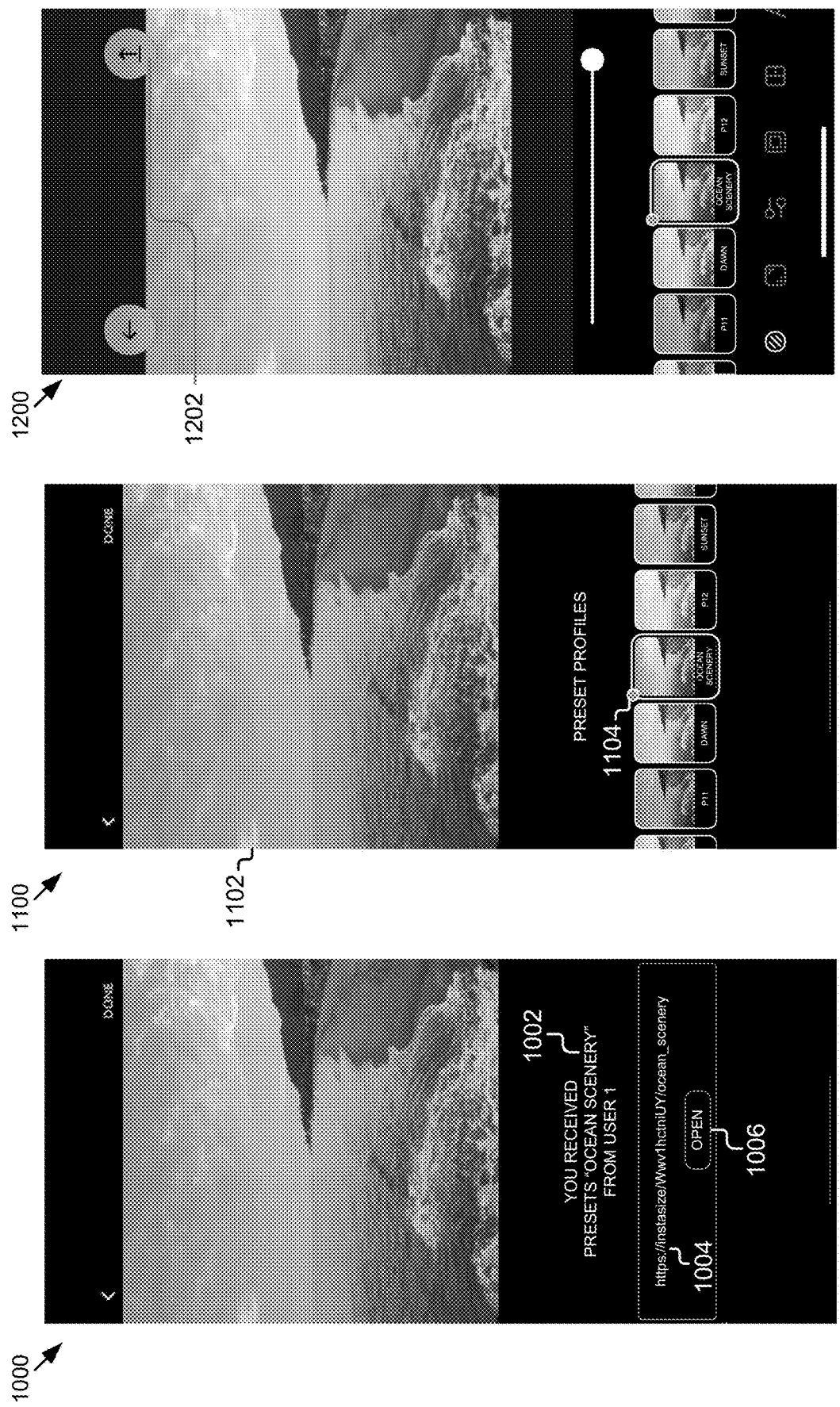

1300

```
{ "presets":
        "presets_name" : "Ocean Scenery",
        "user_ID" : "U081487",
        "image_size" :
        {
                "format_name" : "Instasize Square",
                "image_width" : 320,
                "image_height" : 320,
        },
        "image_filter" :
        {
                "filter_name" : "G2",
                "filter_ID" : "F110503",
        },
        "parameter_adjustments" :
        {
                "exposure_value" : 9,
                "contrast_value" : 32,
                "brightness_value" : 17,
                "sharpness_value" : 28,
                "saturation_value" : -13,
                "tint_value" : -17,
                "warmth_value" : 23,
                "vignette_value" : 58,
                "shadows_value" : -24,
                "highlights_value" : 72,
                "grain_value" : 50,
        },
        "image_crop" :
        {
                "crop_ratio" : "1:1",
                "relative_position" : "center",
        },
        "text" :
        {
                "font" : "blackjack",
                "size" : 14,
                "color" : "blue",
                "text_rotation" : 30,
        },
        "image_background" : "Cosmic",
        "image_rotation" : "none",
}
```

Figure 13

SHAREABLE SETTINGS FOR MODIFYING IMAGES

BACKGROUND

This application relates to automated systems and methods for consistently modifying files. For example, this application relates to an image-modification application that configures sharable settings for modifying images.

Previously, expert content creators manually modified image parameters including composition, cropping, or color filters resulting in visually appealing images. Content creators may post these edited images to social media sites or other media hosting services; however, these services do not easily allow other content creators to easily re-create and/or modify the visual effects of the modified image to create similar-looking images. For instance, a second content creator would have to experiment with modifying parameters of their own images to attempt to imitate the look and feel of a first content creator's modifications to the shared image, which would be inaccurate, difficult, and inefficient.

Previous approaches of applying image filters did not allow for efficient creation or sharing of more complex modifications, nor do they allow users that are using previously created filters to modify the filters. For instance, not only are pre-existing filters very limited in the effects that they can apply, the previous approaches do not allow users to see or modify parameters of filters.

SUMMARY

An image-adjustment sharing system can be configured to perform particular operations or actions by virtue of having software, firmware, hardware, or a combination of them installed on the system that in operation causes or cause the system to perform the actions. One general aspect of the system includes a system and method that perform operations including displaying an image in a user interface, the user interface including one or more editing elements programed to edit one or more image-adjustment settings that affect one or more visual aspects of the image on the user interface; receiving, from a first user via the one or more editing elements, one or more user inputs modifying the one or more editing elements; responsive to receiving the one or more user inputs modifying the one or more editing elements, modifying the one or more image-adjustment settings and applying the modified one or more image-adjustment settings to the one or more visual aspects of the image; receiving, from the first user via the user interface, a first user input requesting to export a settings file including the modified one or more image-adjustment settings; generating the settings file based on the modified one or more image-adjustment settings; and exporting the settings file.

Some embodiments may include one or more of the following features: that generating the settings file includes aggregating the modified one or more image-adjustment settings that were applied to the image and organizing the modified one or more image-adjustment settings based on a predefined file template; that the modified one or more image-adjustment settings specify a value of one or more of an image color temperature, a text overlay font, and a cropping parameter; transmitting the settings file to a management server; receiving, from the management server, a shareable link associated with the settings file; receiving, from the first user via the user interface, a second user input requesting to share the shareable link with a second user, responsive to receiving the second user input, transmitting the shareable link at which the settings file is accessible to a second computing device associated with the second user; that the settings file is stored in a JavaScript Object Notation (JSON) data file format; that the settings file is stored in association with a user profile of the first user and accessible from the management server via the shareable link; generating a quick response (QR) code identifying the settings file; receiving an input from the first user via the user interface including an instruction to transmit the QR code to a second computing device; that generating the settings file includes encoding the settings file using a public encryption key; that exporting the settings file includes transmitting the encoded settings file; the method further comprises receiving a second settings file including one or more previously set image-adjustment settings; that displaying the image in the user interface includes modifying a visual representation of the image on the user interface using the one or more previously set image-adjustment settings; that displaying the image in the user interface includes displaying the one or more editing elements to indicate the one or more previously set image-adjustment settings; and that the one or more user inputs modify the one or more previously set image-adjustment settings.

Another general aspect may include a system and method that perform operations including: receiving, at a user device of a first user, a link to a settings file associated with a second user, the settings file including one or more image-adjustment settings; receiving, from the first user, a first user input selecting the link to the settings file; responsive to receiving the first user input, retrieving the settings file using the link; creating, at the user device of the first user, a settings profile based on the settings file; receiving, from the first user, a second user input to apply the settings profile to an image; and applying the settings profile to the image including modifying a visual representation of the image on the user device using the one or more image-adjustment settings.

Some embodiments may additionally or alternatively include one or more of the following features: that creating the settings profile includes loading the one or more image-adjustment settings that affect one or more visual aspects of the image displayed on a user interface of the user device, and applying each of the one or more image-adjustment settings to the image including modifying the one or more visual aspects of the image; that the settings file is generated in association with one or more modified visual aspects of a second image associated with the second user; that the settings file is stored in association with a user profile of the second user and the link; receiving, from the first user via an editing element on a user interface, a third user input modifying the editing element; and responsive to receiving the second user input modifying the editing element, modifying the one or more image-adjustment settings and applying the modified one or more image-adjustment settings to the modified visual representation of the image.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 2-12 are illustrations of example graphical user interfaces for creating and sharing image-adjustment settings.

FIG. 13 illustrates an example settings file.

DESCRIPTION

Figure 1:
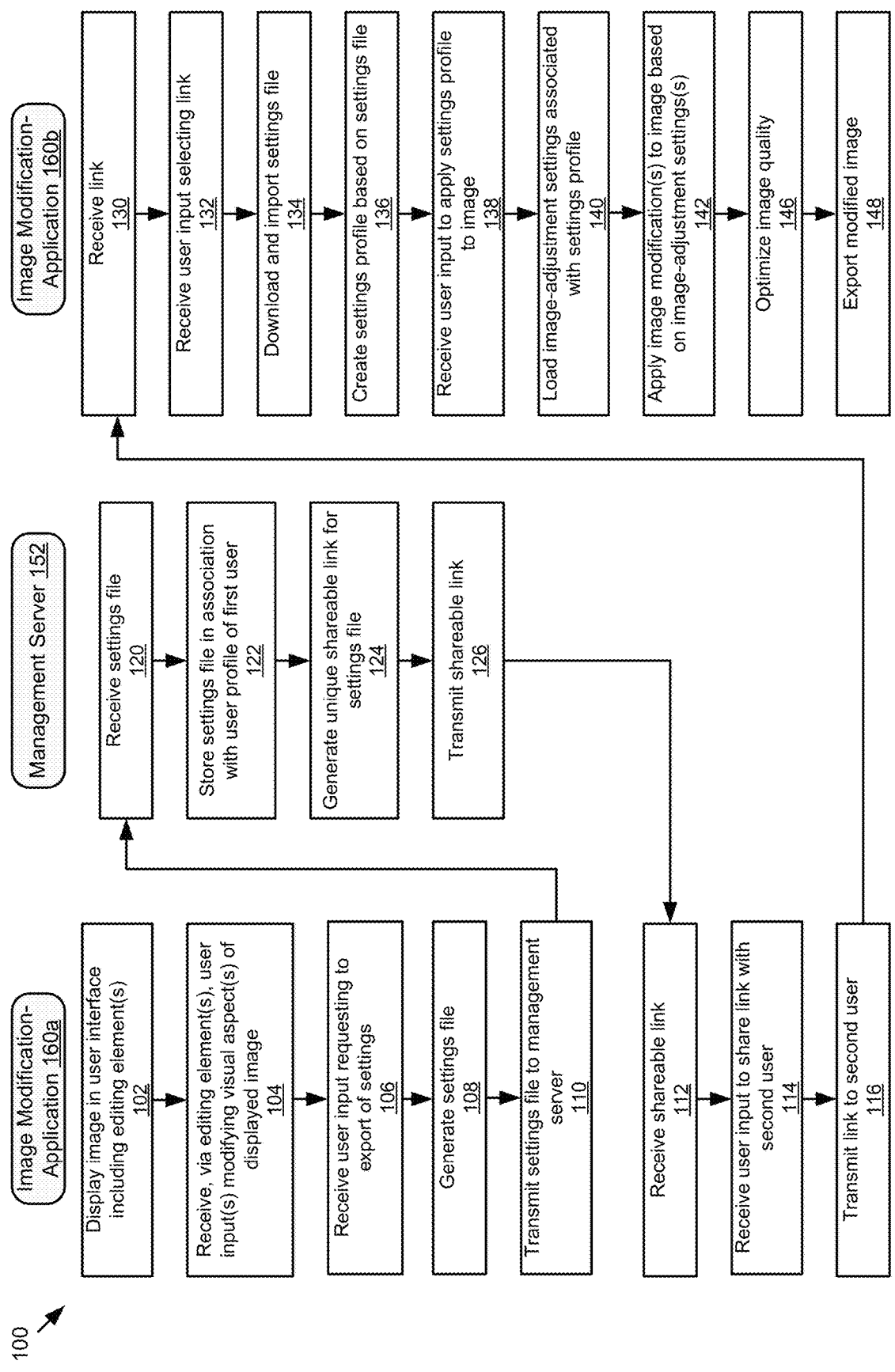
FIG. 1 is a flowchart of an example method for creating and sharing image-adjustment settings.
Figure 4:
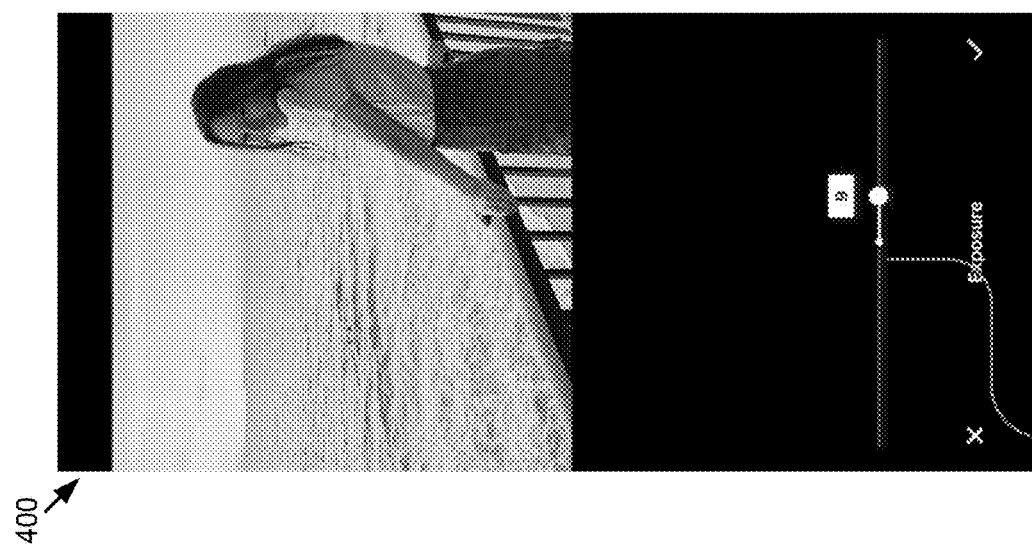
Figure 3:
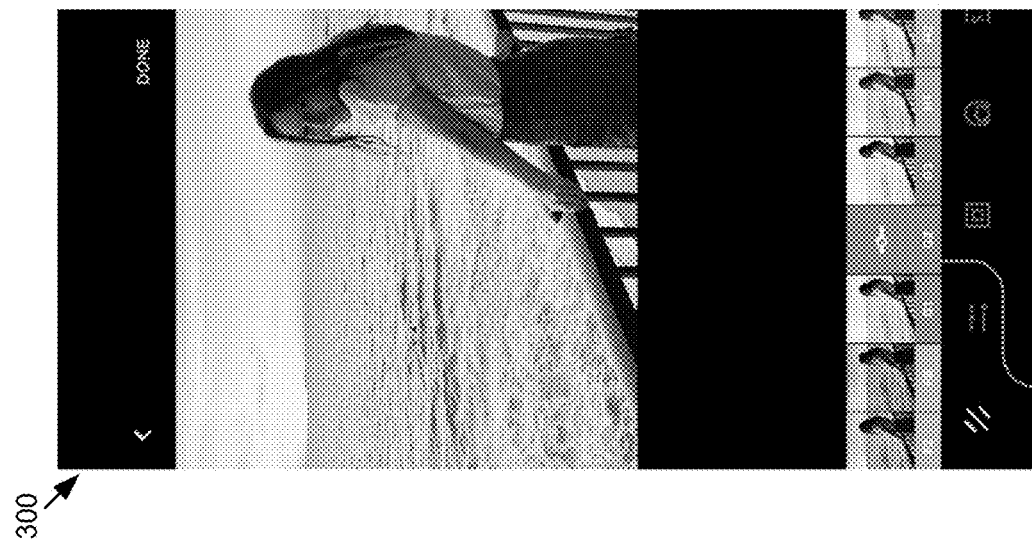
Figure 2:
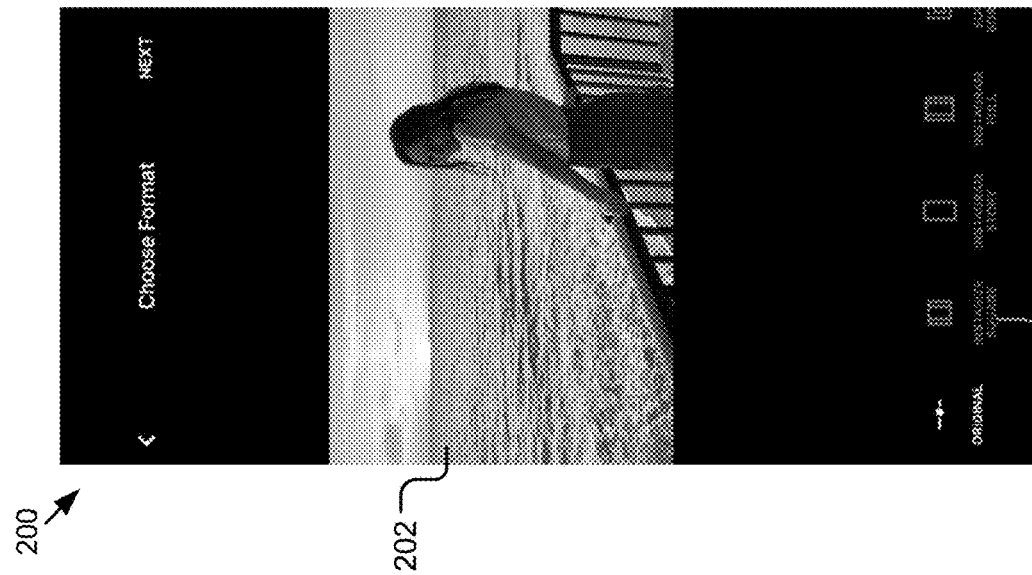

The technology described herein improves on the Background by providing a system that facilitates sharing settings for modifying images. For example, the technology may provide an interface via which a first user may modify one or more visual aspects of a first image, export a settings file describing the modifications applied to the first image, and share the settings file with a second user using a shareable settings link associated with the settings file. In some instances, the second user may use a second instance of the interface to receive the shareable settings link, download the settings file of the first user using the settings link, and import the settings file to create a corresponding settings profile on the second user's computing device. In some embodiments, the instance of the interface on the second user's computing device may display a graphical representation of the imported settings profile, which the second user may select to modify a second image. For instance, the technology may load the image modifications associated with the settings profile and apply these image modifications to the second image. Accordingly, the second image of the second user may be modified with the same modifications that were applied to the first image by the first user.

The technology described herein may also provide improvements over the Background by allowing image-adjustment settings applied to a first image by a first user to be shared with a second user, for example, by allowing an image-modification application 160 of the first user to export a settings file describing the image modifications adjusting one or more visual aspects of images. Accordingly, embodiments of the present technology may eliminate a need for the second user to subjectively estimate changes that the first user applied to the first image and manually adjust each corresponding image-adjustment setting of the second image. Thus, the present technology may allow the second user to edit or modify the second image to have a similar visual style or a similar look and feel to the first image of the first user in an effective and convenient manner.

Some embodiments of the technology use an image-modification application 160 to allow a user to efficiently create groups of settings for modifying various visual aspects of an image displayed on a computing device. The image-modification application 160 may package the group of settings together in a file that may be imported on a second instance of the image-modification application 160 executed on a separate computing device. Beneficially, unlike the previous approaches described in the Background, the technology described herein may allow a user importing the settings file to view and, in some instances, modify the image-adjustment settings. For example, based on a second user having imported the settings file, the image-modification application 160 may load a settings profile, display graphical editing elements on a graphical user interface with the adjustments of the settings file already propagated through and displayed using the graphical editing elements. The second user may then interact with the editing elements on the second instance of the image-modification application 160 to modify the image-adjustment settings, which may update a visual representation of the image in real time. In some instances, responsive to the second user changing the editing elements, the image-modification application 160 may modify the settings file and/or settings profile on the computing device of the second user or create a new settings file with the new image-adjustment settings.

The features and advantages described herein are not all-inclusive and many additional features and advantages will be apparent to a person of ordinary skill in the art in view of the figures and description. Also, it should be noted that the language used in the specification has been selected for readability and instructional purposes and not to limit the scope of the inventive subject matter.

With reference to the Figures, reference numbers may be used to refer to components found in any of the figures, regardless whether those reference numbers are shown in the Figures being described. Further, where a reference number includes a letter referring to one of multiple similar components (e.g., component 000*a*, 000*b*, and 000*n*), the reference number may be used without the letter to refer to one or all of the similar components.

FIG. 1 illustrates an example method 100 for generating and sharing a settings file between multiple users. In some embodiments, the method 100 may be performed by an image-modification application 160 implemented on one or more user devices 1402 and/or a management server 152. As illustrated in FIG. 15, the image-modification application 160 may include an image editor 1522 and/or a settings manager 1524. Although these components may be integrated into the image-modification application 160, as depicted in FIG. 15, it should be understood that the image editor 1522 or the settings manager 1524 may also be implemented as standalone or third-party applications, and may collaborate with the image-modification application 160, which may be implemented on various computing entities of the system 1400 depicted in FIG. 14.

In block 102, a first instance of an image-modification application 160*a* (e.g., an image editor 1522 executed on a user device 1402*a* of a first user) may display a first image to a first user in a user interface. The user interface displayed by the image-modification application 160*a* may include one or more editing elements programed to edit or modify one or more image-adjustment settings that affect corresponding visual aspects of the first image. In some embodiments, the visual aspects of the image may include values of the aspects that stipulate how the image is represented in the user interface. For instance, the visual aspects may include a lighting effect, filter effect, image size, rotation angle, image background, cropping settings, image aspect ratio, color saturation, color temperature, exposure level, brightness, contrast ratio, lux, sharpness, tint, filters, text overlay font, frames, etc., and may be adjusted using the editing elements provided in the user interface. For instance, the editing elements may include lighting tools, filter tools, cropping tools, rotation tools, text tools, etc., corresponding to the visual aspects.

In some embodiments, as illustrated in the example graphical user interfaces in FIGS. 2-12, a particular editing element may include a slider that adjusts the value of a corresponding image-adjustment setting and, correspondingly, a visual aspect of the image displayed on the graphical user interface. The image-modification application 160 may store the values of the image-adjustment setting(s), as described below, and may cause the displayed graphical editing element to persistently display the stored value (e.g., a slider may be displayed at the stored value).

In block 104, the image-modification application 160*a* may receive one or more user inputs modifying the first image from the first user. For example, the image editor 1522 may receive the user inputs from the first user that modify one or more visual aspects of the first image via the corresponding editing elements. For example, as depicted in the user interface 200 in FIG. 2, the first user may select the size format of "Instasize Square" 204 to adjust the size and/or dimensions of the first image 202. As depicted in the user interface 300 in FIG. 3, the first user may apply the image filter "G2" 304, which may adjust the color temperature and saturation, to the first image 202. As depicted in the user interfaces 400, 500, and 600 in FIGS. 4-6, the user may adjust an exposure value, a contrast value, and a saturation value using graphical editing elements (e.g., sliders, numerical entries, pinwheels, etc.) 404, 504, and 604 respectively, thereby modifying the corresponding visual aspects of the first image 202 with a particular lighting effect. Thus, as a result of these image modifications, the representation of the first image 202 may be adjusted in a specific way to achieve a particular look and feel that the first user desires while the content of the image depicted in the first image 202 may remain unchanged (e.g., a girl standing on a balcony by the beach).

In block 106, the image-modification application 160*a* may receive a first user input from the first user requesting to export the image-adjustment settings associated with the first image. For example, the settings manager 1524 executed on the first user device 1402 may receive an input from the first user via the user interface requesting to export a settings file or settings profile. As depicted in the example user interfaces 700 and 800 in FIGS. 7 and 8, respectively, a user may select an option 702 to save the image-adjustment settings of the first image 202 as a group, file, or profile of image-adjustment settings (e.g., preset settings for future images), and enter the name for the file or profile, for example, as "Ocean Scenery" at the text entry field 802.

In block 108, responsive to receiving the input from the first user requesting to export the image-adjustment settings, the image-modification application 160*a* may generate a settings file (e.g., a group or profile of image-adjustment settings or presets) associated with the first image. For example, the settings manager 1524 may generate a settings file based on the modified visual aspects of the first image. The settings file may describe the visual aspects of the first image that were modified by the first user. In some embodiments, the settings file may include one or more image-adjustment settings or parameters that the first user applied to modify corresponding visual aspects (e.g., image size, image filter, adjustment parameters, crop parameters, text parameters, image background, image rotation, etc.) of an image (e.g., the first image 202). In some embodiments, the settings file may also include a name of the image-adjustment settings or profile (e.g., "Ocean Scenery"), a user identifier (ID) of the first user exporting the settings file, and/or other data attributes. In some embodiments, if selected by the first user, the settings file may include an example of the original and/or modified image of the first user to provide an example of the modifications performed by the image-adjustment settings.

In some embodiments, the settings file may be generated in the form of a structured data file in which various data attributes of the settings file are organized in a predefined template. In some embodiments, the settings file may conform to a structured data file format such as JSON (JavaScript Object Notation), XML (Extensible Markup Language), CSV (Comma Separated Value), etc. In some embodiments, to generate the settings file for the first image, the settings manager 1524 may aggregate the image-adjustment settings of the image-adjustment settings that were applied to the first image and organize these settings, parameters, and/or other data attributes into the settings file based on a predefined template for the settings file, for example, to allow the settings file to be used, and in some instances modified, on other instances of the image-modification application 160.

An example settings file 1300 is illustrated in FIG. 13 that includes various attributes and their values, which indicate image-adjustment settings. As depicted, the settings file 1300 may include a "presets_name" attribute indicating the name of the image-adjustment settings (e.g., Ocean Scenery), a "user_ID" attribute indicating the user ID (e.g., U081487) of the first user that modified the first image and exported the settings file for the first image. The settings file 1300 may also include an "image_size" attribute describing the modified image size of the first image. The image size may include a format name (e.g., Instasize Square), image width (e.g., 320 pixels), image height (e.g., 320 pixels), etc. An "image_crop" attribute may describe a crop effect applied to the an image, such as a crop ratio indicating the ratio of the cropped dimensions of an image (e.g., 1:1) and/or a relative position of the remaining portion of the modified image relative to an original image (e.g., centered). An "image_rotation" attribute may describe a rotation applied to the first image (e.g., none, 20 degrees, 45 degrees, etc.). An "image_background" attribute may describe a background applied to the first image (e.g., Cosmic). As depicted in FIG. 13, the settings file 1300 may also include an "image_filter" attribute describing a filter applied to the first image and may include a filter name (e.g., G2) and filter ID (e.g., F110503), for example. The settings file 1300 may include a "text" attribute describing a text format of text inserted into or overlaid over an image. For example, the text settings may include a font (e.g., blackjack), size (e.g., 14), color (e.g., blue), text rotation (e.g., 30°), etc. In some embodiments, the settings file 1300 may also include a "parameter_adjustments" attribute that indicates values of various parameters that may be adjusted to modify the image, such as exposure, contrast, brightness, sharpness, tint, warmth, vignette, shadows, highlights, grain, etc. Other data attributes of the settings file are also possible and contemplated herein.

Referring again to FIG. 1, in block 110, the image-modification application 160*a* may transmit the settings file associated with the first image to the management server 152, although other embodiments are possible. Additionally or alternatively, an image-modification application 160*a* may transmit the settings file directly to a second instance of the image-modification application 160*b* executed on a second user computing device.

In some implementations, generating the settings file may include encoding or encrypting the settings file using a public key, which can be decoded using a private key. For example, the settings manager 1524 may optionally encode the settings file for data protection and transmit the encoded settings file to the management server 152 or another computing device. In some embodiments, the key (e.g., a private key) to decode the file may be unlocked by performing certain actions, for example, a user using a receiving device may use the image-modification application 160 to unlock the settings file by purchasing it, watching an advertisement, answering a survey question, or performing another interaction with the image-modification application 160.

In some embodiments, in block 120, the management server 152 may receive the settings file from the image-modification application 160a (e.g., executed on a first user device 1402). In block 122, the management server 152 may store the settings file in association with the first user who modified the first image, the exported the settings file for the first image, and/or, in some instances, other details such as the original and modified first image, a public or private key, etc. For example, the management server 152 (e.g., a settings manager 1524 or other component) may optionally decode the settings file, analyze the settings file, and store the settings file in association with the first user based on the user ID of the first user extracted from with the settings file, received with the settings file, or associated with an instance of the image-modification application 160a. In some embodiments, a settings manager 1524 may store the settings file associated with the first image in a local data store of the management server 152. Additionally or alternatively, the settings manager 1524 may store the settings file associated with the first image in a third-party cloud server.

In block 124, the management server 152 may generate a shareable settings link for the settings file. For example, the management server 152 may generate a unique shareable link that specifies the location from which the settings file can be retrieved. In some embodiments, if the settings file of the first user is stored in a third-party server, the settings manager 1524 may determine the shareable settings link for the settings file to be a link (e.g., Uniform Resource Locator or URL) from which the settings file can be retrieved from the third-party server.

In some embodiments, the management server 152 may scrub personally identifiable information from the settings file to share it anonymously. Additionally or alternatively, the management server 152 may identify the first user associated with the settings file or settings profile for purposes of attribution.

In some embodiments, the shareable link or the settings file may be encoded in another format, such as a quick response (QR) code, bar code, image, or other mechanism for providing access to the settings file.

In block 126, the management server 152 may transmit the shareable settings link associated with the settings file to a first image-modification application 160a of the first user device 1402a. Additionally or alternatively, the management server 152 may transmit the shamble link directly (e.g., not via the management server 152, via e-mail, SMS message, etc.) to a second instance of the image-modification application 160b on a second user computing device 1402n based on a request from the image-modification application 160a or 160b. In some embodiments, the management server may provide a library of settings files/profiles for download and use on image-modification applications 160.

In block 112, the image-modification application 160a may receive the shareable link associated with the settings file from the management server 152. For example, the settings manager 1524 of the image-modification application 160a (e.g., executed on the first user device 1402a), may receive the shareable link associated with the settings file and display it or a representation of it to the first user on the user interface. For example, as illustrated in the user interface 900 in FIG. 9, an image-modification application 160 may display a graphical representation 902 of the shareable link, QR code, or other sharing device by which the image-adjustment settings file of the image-adjustment settings "Ocean Scenery" is retrievable. As depicted in FIG. 9, the user interface 900 may also include selectable option 904 for the first user to copy or otherwise share the shareable link. In some embodiments, the user interface 900 may display graphical options 906 that may be selected by the first user to share the shareable link and/or the settings file with other users and/or groups of users.

In block 114, the image-modification application 160a may receive a second user input from the first user requesting to share the shareable link and/or the settings file with a second user, such as user via the user interface 900. For example, as depicted in the example user interface 900 in FIG. 9, a first user may select a second user (e.g., user 5) with which to share the shareable link and/or settings file. Additionally or alternatively, the first user may make the shareable settings link of publicly available, such as by including the shareable link of the settings file on a website, a social network page, etc.

In block 116, responsive to receiving the second user input requesting to share the settings file or profile, the image-modification application 160a may transmit the shareable link and/or settings file to a second user. For example, in the first user device 1402, the settings manager 1524 may transmit the shareable link and/or settings file using a direct message to a second instance of the image-modification application 160b, e-mail, SMS (short messaging service) text message, MMS (multimedia messaging service) message, or other means to a computing device associated with the second user. Additionally or alternatively, the settings manager 1524 may instruct the management server 152 to transmit the shareable link and/or the settings file to a second user device 1402n of a second user.

In some embodiments, in block 130, a second instance of an image-modification application 160b (e.g., executed on a user device 1402n of a second user) may receive the link and/or settings file from the first user device 1402 of the first user or from the management server 152. For example, a settings manager 1524 on a second user device 1402b may receive the link to the settings file created by the first user and display a graphical representation of it to the second user on a user interface of the second user device 1402. For instance, as depicted in the user interface 1000 in FIG. 10, the image-modification application 160b may cause a notification 1002 to be displayed on the second user device 1402b indicating receipt of the settings file or profile "Ocean Scenery" from the first user and/or management server 152. As depicted, the user interface 1000 may include a graphical representation 1004 of the link to the settings file/profile (e.g., of "Ocean Scenery") and, in some instances, a selectable option 1006 for the second user to open, import, or use the link, settings file, or profile.

In some embodiments, in block 132, the image-modification application 160b may receive an input from the second user selecting the link or a graphical representation of the settings file or profile. For example, the settings manager 1524 of the image-modification application 160b may receive the input via the user interface. For example, as depicted in the user interface 1000 in FIG. 10 and described above, a user may select an option 1006 to open the settings link and/or import the settings profile.

In block 134, responsive to receiving the input from the second user described above, the second instance of the image-modification application 160b may download and/or import the settings file received from the user device 1402 of the first user or the management server 152. For example, the settings manager 1524 of the image-modification application 160b may download the settings file from a location specified by the link and import the settings file into a local computer memory location of the second user device 1402n used by the image-modification application 160b.

In block 136, the second user device 1402 may create a settings profile based on the received settings file. For example, in the second user device 1402, the settings manager 1524 may analyze the settings file of the first user and determine the modifications to visual aspects of an image that are specified by the image-adjustment settings read from the settings file. The settings manager 1524 may generate a settings profile including the image-adjustment settings, and update a settings library (e.g., a set of settings files or profiles available to apply using an image-modification application 160) of the image-modification application 160b on the user device 1402n to include the settings profile. As discussed above, a settings profile may be a group of image-adjustment settings previously set to modify the appearance of the image. The image-modification application 160 may display a graphical element 1104 representing a profile, as discussed below. In some instances, the image-modification application 160 may allow the user (e.g., the second user) to modify the individual settings of the settings profile.

In some embodiments, as depicted in the user interface 1100 in FIG. 11, the settings manager 1524 of the image-modification application 160b may create and display the settings profile based on the imported settings file. For instance, the image-modification application 160b may provide the settings profile "Ocean Scenery" in the user interface 1100 of the second user device as an available settings profile, which the image-modification application 160 may apply to images. For instance, the user interface 1100 may display an image selected by the second user to which various profiles can be applied. As illustrated, in some embodiments, a preview of the settings profile (e.g., "Ocean Scenery") changes to an image may be rendered using a selectable a graphical element 1104 to indicate the availability of the settings profile in the settings library.

In block 138, the second instance of the image-modification application 160b may receive an input from the second user to apply the created settings profile, for example, via the user interface. For example, as depicted in the user interface 1100 in FIG. 11, the second user may select the settings profile "Ocean Scenery" by interacting with the graphical element 1104.

In block 140, the image-modification application 160b may load the image-adjustment settings of the selected settings profile and may, in block 142, apply the image-adjustment settings to the new image to modify visual aspects of the new image. For example, a settings manager 1524 may load the settings and the image editor 1522 may apply settings to the image. Accordingly, the visual representation of the second image may be modified in the same manner as the representation of the first image of the first user described above. For example, by applying a format, filter, background, adjustment values, etc., specified in the settings profile, the image editor 1522 may modify the second image of the second user to have the same format, filter, background, adjustment values, etc., as the first image of the first user, thereby achieving a similar look and feel to the first image. In some embodiments, the image-modification application 160 may modify the second image or may create a new image that is modified using the settings profile.

In some embodiments, the second user may further modify the second image after applying the settings profile to the image, for example, using editing elements (e.g., as described in reference to FIGS. 2-7) for adjusting image-adjustment settings. For example, as depicted in the user interface 1200 in FIG. 12, the second user may continue to modify the second image using the editing elements provided in the user interface 1200.

In some embodiments, in response to a user selecting an editing element after applying a settings profile, the image-modification application 160b may change the image-adjustment settings in the settings file (e.g., a copy stored in the memory of the second user device 1402n or in association with the second user on the management server 152) to change the settings profile or create a new settings profile. For example, the image-modification application 160b may display graphical editing elements (e.g., sliders, pinwheels, etc., as described above), which it may automatically set to display the values of the previously set, default, or modified image-adjustment settings. In some instances, the pre-set editing elements may be editable, so that the second user may vary the settings and the corresponding visual aspects of the second image and, in some instances, the settings profile.

In some embodiments, in block 146, the image-modification application 160b or management server 152 may optimize an image quality of the second image. For example, once the image-adjustment settings of the settings profile are applied to the second image to modify its visual appearance, the image editor 1522 may optimize the image quality of the second image by automatically adjusting its saturation, brightness, resolution, or other aspects. For example, the image editor 1522 may compute an average value of the original image intensity (e.g., brightness and/or saturation) of the second image and the maximal image intensity of the second image, and it may adjust the image intensity of the modified second image to the average value. As another example, the image-modification application 160b may render a full resolution copy (e.g., rather than a preview) of the second image using the applied image-adjustment settings (e.g., of the settings profile). Other embodiments for optimizing the image quality of the modified second image are also possible and contemplated.

Once the second user is satisfied with the modified second image, the second user may provide an input to the image-modification application 160b instructing it to export the modified second image, for example, by selecting an option 1202 in FIG. 12.

In block 148, responsive to receiving the input instructing to export the image, the image-modification application 160b may prepare and export the modified second image. For instance, the image-modification application 160b may save the modified second image in a data store, include it in a document, upload it to a website, post it to a social network page, or transmit it to another user or device, etc.

Figure 14:
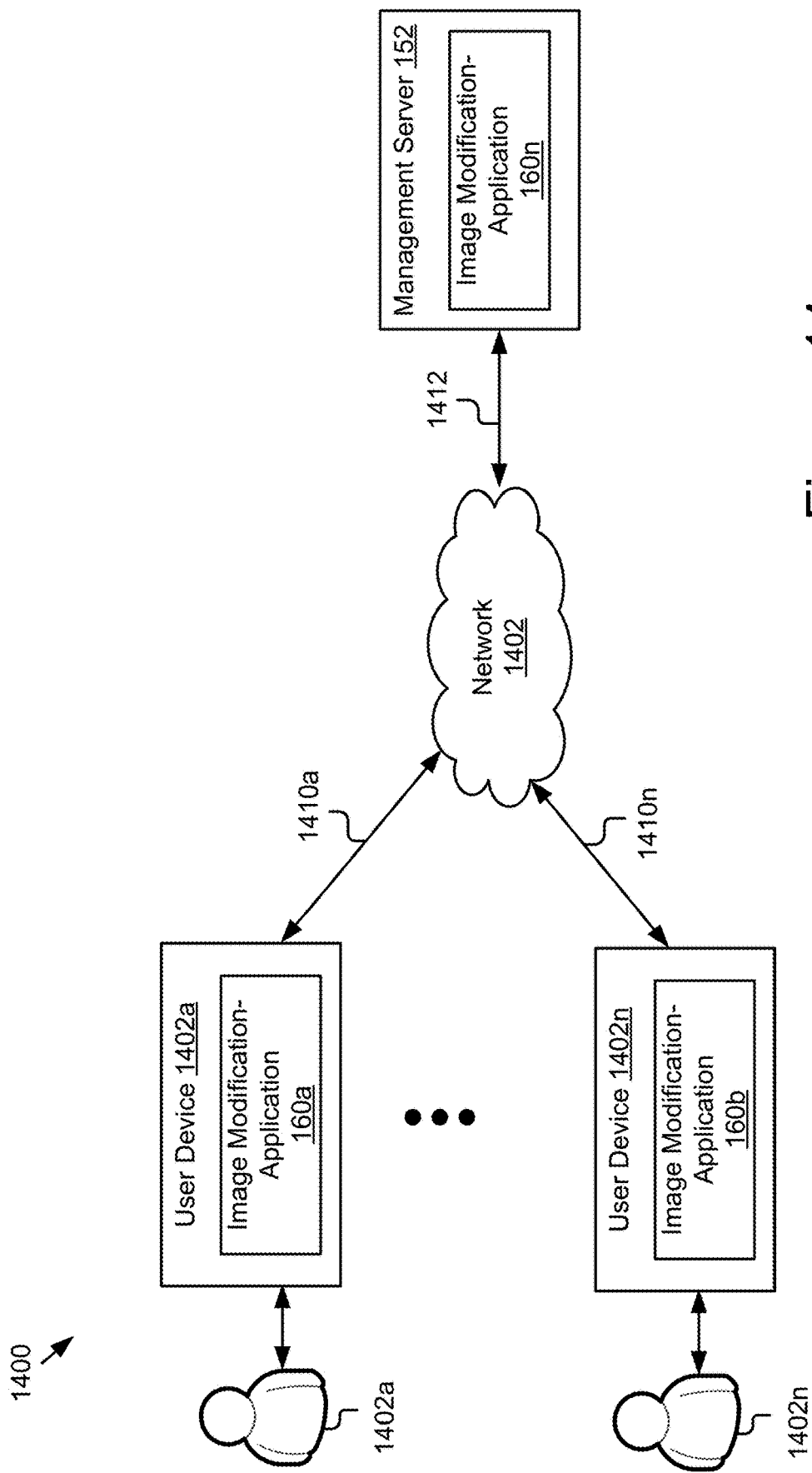
FIG. 14 is a block diagram of an example system and data communication flow for sharing image-adjustment settings.
Figure 15:
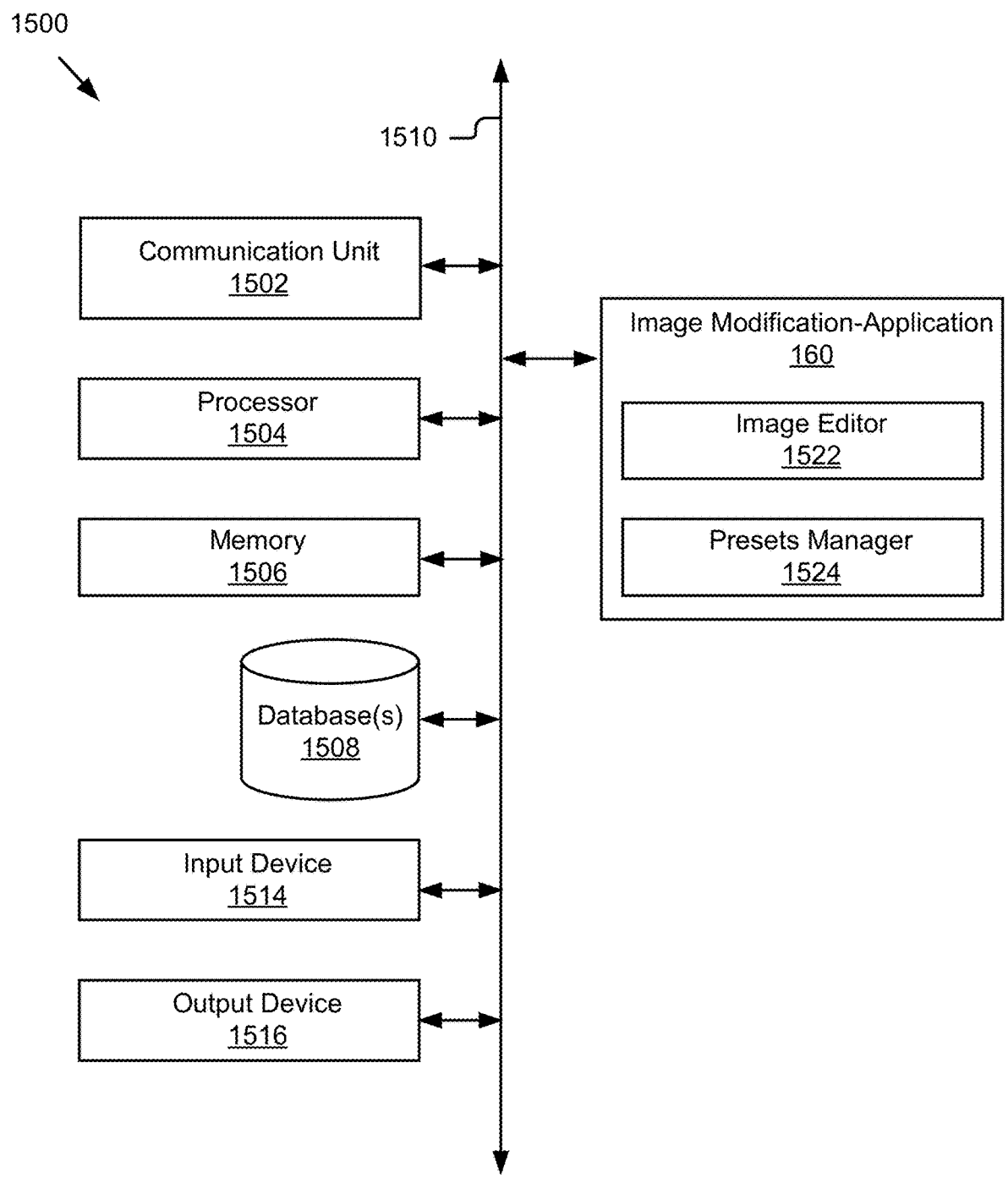
FIG. 15 is a block diagram illustrating an example computing device for executing an image-modification application.

As depicted in FIG. 14, the illustrated computing system 1400 for generating and sharing settings file between multiple users may include user device(s) 1402a . . . 1402n (also referred to herein individually and/or collectively as 1402), and management server(s) 152, which are electronically communicatively coupled via a network 1402 for interaction with one another, although other system configurations are possible including other devices, systems, and networks. For example, the computing system 1400 may include any number of user devices 1402, the management servers 152, and other systems and devices. The user devices 1402a . . . 1402n and/or their components may be coupled to the network 1402. The management server 152 and its components may be coupled to the network 1402.

The network 1402 may include any number of networks and/or network types. For example, the network 1402 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The management server 152 may have data processing, storing, and communication capabilities, as discussed elsewhere herein. For example, the management server 152 may include one or more hardware servers, server arrays, storage devices and/or systems, etc. In some embodiments, the management server 152 may include one or more virtual servers, which operate in a host server environment. As depicted, the management server 152 may include components or an instance of the image-modification application 160, etc., as discussed elsewhere herein. The management server 152 may also host services such as a third-party application (not shown), which may be individual and/or incorporated into the services provided by the management server 152. For example, a third-party application may provide social network service to users in which the users may edit their images using the image-modification application 160, and include the modified images in their social network page.

FIG. 15 illustrates a computing device 1500 that can represent the user device 1402, the management server 152, or another device. As depicted, the computing device 1500 may include a communication unit 1502, a processor 1504, a memory 1506, database(s) 1508, an input device 1514, an output device 1516, and/or an image-modification application 160, which may be communicatively coupled using a communication bus 1510. The computing device 1500 depicted in FIG. 15 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing device 1500 may include various operating systems, sensors, additional processors, and other physical configurations. Although, for purposes of clarity, FIG. 15 only shows a single communication unit 1502, processor 1504, memory 1506, etc., it should be understood that the computing device 1500 may include a plurality of one or more of these components.

The processor 1504 may execute software instructions by performing various input, logical, and/or mathematical operations. The processor 1504 may have various computing architectures to method data signals including, for example, a complex instruction set computer (CISC) architecture, a reduced instruction set computer (RISC) architecture, and/or an architecture implementing a combination of instruction sets. The processor 1504 may be physical and/or virtual, and may include a single core or plurality of processing units and/or cores. In some embodiments, the processor 1504 may be capable of generating and providing electronic display signals to a display device, supporting the display of images, capturing and transmitting images, performing complex tasks including various types of feature extraction and sampling, etc. In some embodiments, the processor 1504 may be coupled to the memory 1506 via the bus 1510 to access data and instructions therefrom and store data therein. The bus 1510 may couple the processor 1504 to the other components of the computing device 1500 including, for example, the communication unit 1502, the memory 1506, the input device 1514, the output device 1516, and the database(s) 1508.

The memory 1506 may store and provide access to data to the other components of the computing device 1500. The memory 1506 may be included in a single computing device or a plurality of computing devices. In some embodiments, the memory 1506 may store instructions and/or data that may be executed by the processor 1504. For example, the memory 1506 may store an image-modification application 160 and its respective components, depending on the configuration. The memory 1506 is also capable of storing other instructions and data, including, for example, an operating system, hardware drivers, other software applications, databases, etc. The memory 1506 may be coupled to the bus 1510 for communication with the processor 1504 and the other components of the computing device 1500.

The memory 1506 may include a non-transitory computer-usable (e.g., readable, writeable, etc.) medium, which can be any non-transitory apparatus or device that can contain, store, communicate, propagate or transport instructions, data, computer programs, sofhvare, code, routines, etc., for processing by or in connection with the processor 1504. In some embodiments, the memory 1506 may include one or more of volatile memory and non-volatile memory (e.g., RAM, ROM, hard disk, optical disk, etc.). It should be understood that the memory 1506 may be a single device or may include multiple types of devices and configurations.

The bus 1510 may include a communication bus for transferring data between components of a computing device or between computing devices, a network bus system including the network 1402 or portions thereof, a processor mesh, a combination thereof, etc. In some embodiments, a management server 152, image-modification application 160, and/or various other components operating on the computing device 1500 (operating systems, device drivers, etc.) may cooperate and communicate via a communication mechanism included in or implemented in association with the bus 1510. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1502 may include one or more interface devices (I/F) for wired and wireless connectivity among the components of the system 1400. For example, the communication unit 1502 may include various types known connectivity and interface options. The communication unit 1502 may be coupled to the other components of the computing device 1500 via the bus 1510. The communication unit 1502 may be electronically communicatively coupled to the network 1402 (e.g., wiredly, wirelessly, etc.). In some embodiments, the communication unit 1502 may link the processor 1504 to the network 1402, which may in turn be coupled to other processing systems. The communication unit 1502 may provide other connections to the network 1402 and to other entities of the computing system 1400 using various standard communication protocols.

The input device 1514 may include any device for inputting information into the computing device 1500. In some embodiments, the input device 1514 may include one or more peripheral devices. For example, the input device 1514 may include a sensor, a keyboard (e.g., a virtual keyboard), a pointing device (e.g., a virtual mouse device), a microphone for receiving user input via speech, an image/video capture device (e.g., camera), a touch-screen display integrated with the output device 1516, etc.

The output device 1516 may be any device capable of outputting information from the computing device 1500. The output device 1516 may include one or more of a speaker, a display (LCD, OLED, etc.), a haptic device, a touch-screen display, a light indicator, etc. In some embodiments, the output device 1516 may be a display that can display electronic images with different image-adjustment settings (e.g., image light, image intensity, etc.). In some embodiments, the computing device 1500 may include a graphics adapter (not shown) for rendering and outputting the images and data for presentation on the output device 1516. The graphics adapter (not shown) may be a separate processing device including a separate processor and memory (not shown) or may be integrated with the processor 1504 and the memory 1506.

The database(s) 1508 may be data store(s) for storing and providing access to data. The data stored by the database(s) 1508 may be organized and queried using any type of data stored in the database(s) 1508 (e.g., user ID, image ID, settings file or profile ID, settings link, image-adjustment settings, etc.). The database(s) 1508 may include file systems, databases, data tables, documents, or other organized collections of data. Examples of the types of data stored in the database(s) 1508 may include user data, image data, settings data, etc.

The database(s) 1508 may be included in the computing device 1500 or in another computing system and/or storage system distinct from but coupled to or accessible by the computing device 1500. The database(s) 1508 may include one or more non-transitory computer-readable mediums for storing the data. In some embodiments, the database(s) 1508 may be incorporated with the memory 1506 or may be distinct therefrom. In some embodiments, the database(s) 1508 may store data associated with a database management system (DBMS) operable on the computing device 1500. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The components of the computing device 1500 may be communicatively coupled by the bus 1510 and/or the processor 1504 to one another and/or to other components of the computing system 1400. In some embodiments, the image-modification application 160 may include computer logic (e.g., software logic, hardware logic, etc.) executable by the processor 1504 to provide image editing and/or image-adjustment settings management functionalitics. As depicted in FIG. 15, the image-modification application 160 may include an image editor 1522 and/or settings manager 1524, although other embodiments are possible. In any of the foregoing embodiments, the image-modification application 160 may be adapted for cooperation and communication with the processor 1504 and the other components of the computing system 1400.

It should be understood that the computing system 1400 illustrated in FIG. 14 and the computing device 1500 illustrated in FIG. 15 are representative of example systems and that a variety of different system environments and configurations are contemplated and are within the scope of the present disclosure. For instance, various acts and/or functionality may be moved from a server to a client, or vice versa, data may be consolidated into a single data store or further segmented into additional data stores, and some embodiments may include additional or fewer computing devices, services, and/or networks, and may implement various functionality client or server-side. Further, various entities of the system may be integrated into a single computing device or system or divided into additional computing devices or systems, etc.

Methods are described herein; however, it should be understood that the methods are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to embodiment in any specific programming language, or for any specific operating system or environment. Accordingly, the disclosure is intended to be illustrative, but not limiting, of the scope of the subject matter set forth in the following claims.

What is claimed is:

1. A method comprising:
    displaying one or more images in one or more user interfaces, the one or more user interfaces including one or more editing elements programed to edit one or more image-adjustment settings that affect one or more visual aspects of the one or more images on the one or more user interfaces;
    receiving, from a first user via the one or more editing elements, one or more user inputs modifying the one or more editing elements;
    responsive to receiving the one or more user inputs modifying the one or more editing elements, modifying the one or more image-adjustment settings and applying the modified one or more image-adjustment settings to the one or more visual aspects of the one or more images;
    receiving, from the first user via the one or more user interfaces, a first user input requesting to export a settings file including the modified one or more image-adjustment settings;
    generating the settings file based on the modified one or more image-adjustment settings;
    exporting the settings file;
    displaying a set of graphical elements with the one or more images in the one or more user interfaces, the set of graphical elements including a plurality of previews of the one or more images, each of the set of graphical elements representing a separate settings profile including separate image-adjustment settings; and
    modifying the set of graphical elements in the one or more user interfaces to include a graphical element for the generated settings file and previewing the one or more images based on the generated settings file at the graphical element for the generated settings file.

2. The method of claim 1, wherein generating the settings file includes:
    aggregating the modified one or more image-adjustment settings that were applied to the one or more images; and
    organizing the modified one or more image-adjustment settings based on a predefined file template.

3. The method of claim 2, wherein the modified one or more image-adjustment settings specify a value of one or more of an image color temperature, a text overlay font, and a cropping parameter.

4. The method of claim 1, further comprising:
    transmitting the settings file to a management server; and
    receiving, from the management server, a shareable link associated with the settings file.

5. The method of claim 4, further comprising:
    receiving, from the first user via the one or more user interfaces, a second user input requesting to share the shareable link with a second user; and
    responsive to receiving the second user input, transmitting the shareable link at which the settings file is accessible to a second computing device associated with the second user.

6. The method of claim 5, wherein:
    the settings file is stored in a JavaScript Object Notation (JSON) data file format; and
    the settings file is stored in association with a user profile of the first user and accessible from the management server via the shareable link.

7. The method of claim 1, further comprising:
    generating a quick response (QR) code identifying the settings file; and
    receiving an input from the first user via the one or more user interfaces including an instruction to transmit the QR code to a second computing device.

8. The method of claim 1, wherein:
    generating the settings file includes encoding the settings file using a public encryption key; and
    exporting the settings file includes transmitting the encoded settings file.

9. The method of claim 1, wherein:

the method further comprises receiving a second settings file including one or more previously set image-adjustment settings; and displaying the one or more images in the one or more user interfaces includes modifying a visual representation of the one or more images on the one or more user interfaces using the one or more previously set image-adjustment settings.

10. The method of claim 9, wherein displaying the one or more images in the one or more user interfaces includes displaying the one or more editing elements to indicate the one or more previously set image-adjustment settings.

11. The method of claim 10, wherein the one or more user inputs modify the one or more previously set image-adjustment settings.

12. A system comprising:

one or more processors; and a computer memory storing instructions that, when executed by the one or more processors, cause the system to:

display one or more images in one or more user interfaces, the one or more user interfaces including one or more editing elements programed to edit one or more image-adjustment settings that affect one or more visual aspects of the one or more images on the one or more user interfaces;

receive, from a first user via the one or more editing elements, one or more user inputs modifying the one or more editing elements;

determine an average brightness of the one or more images;

responsive to receiving the one or more user inputs modifying the one or more editing elements, modify the one or more image-adjustment settings and applying the modified one or more image-adjustment settings to the one or more visual aspects of the one or more images to create one or more modified images;

after applying the one or more modified image-adjustment settings to create the one or more modified images based on the one or more user inputs modifying the one or more editing elements, automatically modify the modified image based on the average brightness of the one or more images;

receive, from the first user via the one or more user interfaces, a first user input requesting to export a settings file including the modified one or more image-adjustment settings;

generate the settings file based on the modified one or more image-adjustment settings;

export the settings file;

display a set of graphical elements with the one or more images in the one or more user interfaces, the set of graphical elements including a plurality of previews of the one or more images, each of the set of graphical elements representing a separate settings profile including separate image-adjustment settings; and modify the set of graphical elements in the one or more user interfaces to include a graphical element for the generated settings file and previewing the one or more modified images based on the generated settings file.

13. The system of claim 12, wherein generating the settings file includes:

aggregating the modified one or more image-adjustment settings that were applied to the one or more images; and organizing the modified one or more image-adjustment settings based on a predefined file template.

14. The system of claim 13, wherein the modified one or more image-adjustment settings specify a value of one or more of an image color temperature, a text overlay font, and a cropping parameter.

15. The system of claim 12, wherein:

the instructions further cause the system to receive a second settings file including one or more previously set image-adjustment settings; and displaying the one or more images in the one or more user interfaces includes modifying a visual representation of the one or more images on the one or more user interfaces using the one or more previously set image-adjustment settings.

16. The system of claim 15, wherein:

displaying the one or more images in the one or more user interfaces includes displaying the one or more editing elements to indicate the one or more previously set image-adjustment settings, and the one or more user inputs modify the one or more previously set image-adjustment settings.

17. A method comprising:

receiving, at a user device of a first user, a link to a settings file associated with a second user, the settings file including one or more image-adjustment settings;

receiving, from the first user, a first user input selecting the link to the settings file;

responsive to receiving the first user input, retrieving the settings file using the link;

creating, at the user device of the first user, a settings profile based on the settings file;

displaying a set of graphical elements with one or more images in one or more user interfaces, the set of graphical elements including a plurality of previews of the one or more images, each of the set of graphical elements representing a separate settings profile including separate image-adjustment settings;

modifying the set of graphical elements in the one or more user interfaces on the user device to include a graphical element for the received settings file and previewing the one or more images based on the settings file;

receiving, from the first user, a second user input to apply the settings profile to the one or more images; and applying the settings profile to the one or more images including modifying a visual representation of the one or more images on the user device using the one or more image-adjustment settings.

18. The method of claim 17, wherein creating the settings profile includes:

loading the one or more image-adjustment settings that affect one or more visual aspects of the one or more images displayed on the one or more user interfaces of the user device; and applying each of the one or more image-adjustment settings to the one or more images including modifying the one or more visual aspects of the one or more images.

19. The method of claim 17, wherein:

the settings file is generated in association with one or more modified visual aspects of a second image associated with the second user; and the settings file is stored in association with a user profile of the second user and the link.

20. The method of claim 17, further comprising:
receiving, from the first user via an editing element on a user interface, a third user input modifying the editing element; and
responsive to receiving the second user input modifying the editing element, modifying the one or more image-adjustment settings and applying the modified one or more image-adjustment settings to the modified visual representation of the one or more images.

\* \* \* \* \*